US006482894B1

(12) United States Patent
Chang et al.

(10) Patent No.: US 6,482,894 B1
(45) Date of Patent: Nov. 19, 2002

(54) QUICK SET EBONITE COMPOSITION

(75) Inventors: Rong Jong Chang, Fremont, CA (US); William L. Betts, III, Redwood City, CA (US); Linas Mazeika, San Carlos, CA (US)

(73) Assignee: 3L & T, Inc., Mountain View, CA (US)

(*) Notice: Subject to any disclaimer, the term of this patent is extended or adjusted under 35 U.S.C. 154(b) by 51 days.

(21) Appl. No.: 09/724,698

(22) Filed: Nov. 28, 2000

(51) Int. Cl.[7] .......................... C08F 8/00; C08L 37/00; C08L 35/00

(52) U.S. Cl. ...................... 525/191; 525/192; 525/194; 525/208; 525/217; 525/221; 525/222; 525/232; 428/500; 427/386; 524/515; 524/521; 524/525

(58) Field of Search ............................. 525/191, 192, 525/194, 208, 217, 221, 222, 232

(56) References Cited

U.S. PATENT DOCUMENTS

| | | | |
|---|---|---|---|
| 4,418,173 A | * 11/1983 | Brachmann et al. | 524/425 |
| 4,567,093 A | 1/1986 | Sogabe et al. | 428/250 |
| 5,766,687 A | 6/1998 | Rappoport | 427/386 |
| 5,997,953 A | 12/1999 | Rappoport | 427/386 |
| 6,303,683 B1 | * 10/2001 | Figovsky | 524/495 |

FOREIGN PATENT DOCUMENTS

WO WO 00/06639 2/2000

OTHER PUBLICATIONS

Roman Milczarek, "Rubber–to–Metal Bonding Agents", March 1996, Rubber World, p. 26–31.

* cited by examiner

*Primary Examiner*—Nathan M. Nutter
(74) *Attorney, Agent, or Firm*—Lumen Intellectual Property Services, Inc.

(57) ABSTRACT

A liquid ebonite mixture for coating includes two reactive components. The first component contains first unsaturated polymers having first functional groups capable of reaction at ambient condition either with or without a catalyst, a vulcanization agent, and a vulcanization activator. The second component contains second unsaturated polymers having second functional groups that will react with the first functional groups at ambient temperature. The first and the second unsaturated polymers must contain sufficient unsaturated backbones to allow vulcanization with the vulcanization agent. In addition, the second unsaturated polymers must be thermodynamically compatible with the first unsaturated polymers so that macroscopic phase separation will not occur and the vulcanization can happen homogeneously through out the coating. The first and second components further include first and second viscosity reducers, which have viscosity lower than the first and the second unsaturated polymers, for adjusting the viscosity of the liquid ebonite mixture. Furthermore, a thixotropic agent, a reinforcing agent, a vulcanization activator, a vulcanization accelerator, a solubilizer for vulcanization agent, and a catalyst also can be added into the mixture. Liquid ebonite mixture of the present invention is sprayable, and a coating formed by this liquid ebonite mixture sets up quickly without sagging and has low tackiness that allows easy handling and inspection.

34 Claims, No Drawings

QUICK SET EBONITE COMPOSITION

CROSS-REFERENCE TO RELATED APPLICATIONS

This application is related to U.S. patent application Ser. No. 09/724,715 filed Nov. 28, 2000, which is incorporated herein by reference.

FIELD OF THE INVENTION

This invention relates generally to a liquid ebonite coating. More particularly, it relates to a liquid ebonite coating containing two reactive components.

BACKGROUND ART

There is a pervasive and continuing need for protecting metals from corrosive chemical action, such as in metal pipes, stacks, chimneys, bridges, chemical plant constructions, ship hulls, and containers for aggressive chemicals, to name just a few applications. In addition to having a high resistance to chemical action, an ideal coating has certain other properties: the raw materials required to produce the coating are commercially available, inexpensive and non-hazardous; the coating has the ability to be easily applied to the metal, e.g. by spraying, spreading, or free casting; the coating has strong adhesion to many different metals; it is strong, hard, abrasion resistant and thermostable; and the hardening process of the coating can be performed in contact with moisture, does not require extreme or long heating, and does not release toxic fumes. An ideal metal coating may have many additional properties, depending on the particular application or purpose of the coating.

The most widespread anticorrosive coatings possessing many of the above properties are polyurethanes and epoxide resins (see for example, *Coating Systems: A guidance Manual For Field Surveyors,* American Bureau of Shipping and Affiliated Companies, 1995). These coatings have good chemical resistance to many substances, have adhesion to metals that is satisfactory for many purposes, and have good mechanical properties. Neither polyurethanes nor epoxide resins, however., satisfy all the criteria for an ideal coating for metal. In particular, although polyurethanes have outstanding oil-gasoline resistance, a unique combination of favorable physical-mechanical properties, and strong adhesion to some metals, they are not stable under elevated temperature, alkaline hydrolysis, and persistent tension. Epoxide resins, although they have outstanding adhesion to some metals, do not have a satisfactory resistance to acids, certain solvents, temperature changes, and vibration. One of the most significant problems associated with both epoxide resins and polyurethanes is their susceptibility to underfilm corrosion associated with defects in the coating surface. Because these coatings are bonded to the metal only by adhesive bonding, these bonds can be broken by the introduction of moisture, solvents or other substances.

As is known from rubber chemistry (*Encyclopedia of Polymer Science & Technology,* John Wiley & Sons, N.Y., vol 12, p.161, 1970), solid ebonite, commonly known as hard rubber, is a polymer material with sulfur content used for vulcanization. Ebonite, like elastomeric or flexible rubber, is made from a combination of sulfur with polydienes (unsaturated rubbers containing double bonds). The sulfur and polydienes are combined with some auxiliary additives and heated to produce vulcanization. Typical mass ratios of sulfur to rubber are 2:100 for elastomeric rubber and 40:100 for hard rubber. Due to the large degree of sulfide cross-linking formed in the vulcanization process, solid ebonite is a hard, non-flexible, plastic-like material possessed of unique chemical resistance to aggressive substances such as acids, alkalis, salt solutions, oil, and gasoline. In addition, solid ebonite has good mechanical properties. Consequently, these conventional rubbers are commonly used as materials for fuel tanks, containers for aggressive substances, and other applications. In spite of these advantages, however, solid rubbers can not be easily applied to metal surfaces, they release toxic fumes during vulcanization, and they require a long time to harden.

More than 30 years ago liquid rubbers were synthesized. (See Alan R. Luxton, "The Preparation, modification and application of non-functional liquid polybutadienes", *Rubber Chemistry and Technology,* 54 (1981) 3, 596–626.) Like earlier rubbers, liquid rubbers are formed from compounds such as polybutadiene, polyisoprene, butadiene-styrene, and butadiene-nitrile. In contrast to the hard rubbers, which are made from such compounds having molecular weights on the order of 100,000 to 500,000, the liquid rubbers are made from such compounds having molecular weights of only 2,000 to 4,000. Consequently, the low molecular rubbers permit castable processing by pouring, spreading, spraying, or rolling, while providing similar properties as the hard rubbers after curing. Liquid rubber, therefore, may be used to more easily coat metal surfaces.

However, all the prior art liquid ebonite coatings suffer from two major disadvantages. First, during the heating, especially on a vertical surface, the coating will have problems of sagging, flowing or dripping since the viscosity of the coating decreases as the temperature increases. Therefore, their viscosity must be increased to prevent sagging. The high viscosity makes spraying of the liquid ebonite mixture very difficult, and even impossible in some cases. Second, the coatings are gooey, which makes the handling or inspection of the coating before vulcanization impractical. The coating of large equipment, such as a precipitator, requires a tack free surface so that coated parts can be handled and assembled before the whole equipment is heated and vulcanized. Also, critical coatings such as tank linings must be inspected to ensure even coating thickness and holiday free coating. Inspection requires tack free surface so that an inspector can touch or walk (for a large structure) on the coated surface.

Liquid ebonite mixture (LEM) compositions are disclosed by Figovsky in WO 0,006,639 issued Feb. 10, 2000, which contains 10% of a high molecular weight rubber for increasing the viscosity of the liquid ebonite mixture for preventing the problems of sagging. Unfortunately, the high viscosity LEM of Figovsky is unsprayable. Furthermore, LEM of Figovsky is gooey, which makes the handling and inspection of the coating before vulcanization impractical.

A liquid rubber based ebonite coating has been disclosed by Rappoport in U.S. Pat. No. 5,766,687 issued Jun. 16, 1998 and U.S. Pat. No. 5,997,953 issued Dec. 7, 1999. In these prior art patents, to prevent sagging, the viscosity of the liquid ebonite mixture is increased by adding thixotropic fillers, such as bentonites and fume silica, or high structure carbon black. The ebonite coating in Rappoport's inventions includes a single component with the compositions shown in Table 1.

TABLE 1

| Compound | Mass Parts |
|---|---|
| Epoxidized liquid rubber, coating building block | 100 |
| Sulfur, vulcanization agent | 30–35 |
| Polyamine, hardener and solvent | 2–6 |
| Micronized aluminum oxide, heat conducting agent | 5–10 |
| 2-mercapto benzothiazole, accelerator | 2–3 |
| Diphenylguanidine, accelerator | 2–3 |
| Zinc Oxide, activator | 5–6 |
| Cab-O-Sil, thixotropic agent | 2–10 |
| Butadiene-nitrile rubber, elastifer | 1–2 |
| Calcium oxide, absorber | 3–5 |

Unfortunately, the single component ebonite coating of Rappoport sags and is unsprayable.

There is a need, therefore, for a liquid ebonite mixture for coating, which will overcome the disadvantages of the prior art, but still maintain excellent properties, such as chemical resistance and tenacious bonding to metal.

SUMMARY

These objects and advantages are attained by a two-component reactive liquid ebonite mixture.

According to an exemplary embodiment of the present invention, a liquid ebonite mixture for coating contains first and second components. The first component contains first unsaturated polymers, which include first functional groups that are capable of reaction at ambient temperature either with or without a catalyst, a vulcanization activator, and a vulcanization agent. The second component includes second unsaturated polymers, which contain second functional groups that will react with the first functional groups of the first unsaturated polymers at ambient temperature. The first and second unsaturated polymers must contain sufficient unsaturation in the backbones for forming linkages with the vulcanization agent. It is preferable that the polymer backbone be polybutadiene. However, polyisoprene, poly (butadiene-co-acrylonitrile), poly(isobutyl-co-isoprene) or poly(ethylene-co-propylene-co-diene) that contain at least 10 mole % of diene unsaturation can also be used. The mass parts of the first and second unsaturated polymers in the mixture are 50.

The preferable functional groups for the first unsaturated polymers are hydroxyl, epoxy, acrylic, and their combinations. In addition, the first unsaturated polymers can also be functional unsaturated polymers that are partially epoxidized.

The preferable functional groups for the second unsaturated polymers are isocyanate and maleic anhydride. Alternatively, the second unsaturated polymers can be a toluene diisocyanate terminated unsaturated prepolymer or 4,4'-methylene diphenyldiisocyanate terminated unsaturated prepolymer. The second unsaturated polymers must be thermodynamically compatible with the first unsaturated polymers so that macroscopic separation will not occur, and the sulfur vulcanization can happen homogeneously through out the coating.

Sulfur is the main vulcanization agent, and its mass parts is approximately 15–50, preferably 30–50. It is preferable that it has fine particle size so that the dispersion will be easier. The vulcanization activator is zinc oxide, and its mass parts is approximately 5–35. However, zinc stearate can also be used as the vulcanization activator.

The first and second components further include first and second viscosity reducers for adjusting the viscosity of the liquid ebonite mixture. The first and second viscosity reducers typically contains unsaturated polymers, which are the same or similar with the first and second unsaturated polymers, and which must have viscosity lower than the viscosity of the first and second unsaturated polymers respectively. The first and second viscosity reducers may contain no functional groups, or they may contain functional groups that are the same or similar with the first and second functional groups respectively so that each component remains non-reactive at ambient condition until two components are mixed together. The mass parts of the first and second viscosity reducers are approximately 0–30.

Furthermore, fume silica or bentonite is added into the first component as a thixotropic agent, and the amount should be kept as low as possible so that the mixture can be sprayed easily. The mass parts of the thixotropic agent is approximately 0–10. In addition, the first component can contain carbon black, which is used as a reinforcing agent, colorant and UV stabilizer. The amount of the carbon black also should be minimized so that it does not increase the viscosity of the mixture drastically. Typically, the mass parts of the reinforcing agent is approximately 0–10.

The first component, preferably but not absolute necessarily, further contains a sulfur solubilizer. The sulfur solubilizer contains polyamine or polyamide amine with mass parts approximately 1.5–6. In addition as serving as a solubilizer, polyamine is also reactive to the isocyanate groups in the second unsaturated polymers to form polyurea linkages, which accelerates the gelation process. The polyamine in the first component can be substituted by butadiol, a chain extender. Furthermore, a urethane catalyst, such as dibutyl tin dilaurate (DBTDL), is also added into the first component with mass parts approximately 0–3. Alternatively, other urethane catalysts, such as K-KAT 348, a Bismuth carboxylate based compound, can also be used.

A vulcanization accelerator with mass parts approximately 1–7 is additionally added into either first or second components. Tetramethylthiuram disulfide, such as Methyl Tuads, is a preferable vulcanization accelerator because it causes the mixture to gel and become tack free quickly, and the mixture is also can be vulcanized at lower temperature or in shorter time. However, Methyl Tuads is only added into the second component since it works synergistically with polyamine, which is contained in the first component, to accelerate the sulfur vulcanization that makes the sulfur curing feasible at 80° C. Therefore, at ambient temperature, if Methyl Tuads is contained in the first component with polyamine, a gelation process will occur. Thus, to maintain sufficient shelf life, Methyl Tuads must be separated from polyamine and is mixed into the second component. Other similar thiuram, such as tetrabutylthiuram disulfide, tetraisobutylthiuram disulfide, tetrabenzylthiuram disulfide, 2-mercaptobenzothiazole, benzothiazyl disulfide, oxydiethylenebenzothiazole-2-sulfenamide, N-cyclohexylbenzothiazole-2-sulfenamide, N-tert-butyl-2-bemzothiazolesulfenamide, can also be added in the second component as a vulcanization accelerator. Dyphenylguanidine (DGP) is also used as a vulcanization accelerator. Since DGP can be mixed with polyamine in the first component without causing a shelf life problem, it can be added in the first component. However, using DGP as a vulcanization accelerator the gelation and tack free time are longer.

The first and second components are first formed separately by mixing their compositions. The two components are then simultaneously mixed together with a mass ratio of between about 0.75 and about 2.75 and sprayed onto a metal substrate. Upon mixing and spraying, the first functional group of the first unsaturated component will react with the second functional group of the second unsaturated polymers, optionally with the aid of tin catalyst, at ambient temperature and gel to a non-gooey rubbery state. The gelation prevents coating from flowing, particularly on a vertical surface, to ensure an even coating thickness. The coating is then heated to elevated temperature for sulfur vulcanization. The vulcanization condition can vary from 180° C. for 30 minutes to 80° C. for three days, depending on the selection of vulcanization accelerator and process temperature. During the heating, especially on a vertical surface, the coating will not drip or sag due to the gelation. After the vulcanization, the coating is further hardened to a tough surface. The coating possesses excellent adhesion to steel and exhibits outstanding chemical resistance.

The above embodiments provide a liquid ebonite coating that is readily sprayable. Such a liquid ebonite coating may be set up quickly without sagging and have a controllable thickness.

Furthermore, the above embodiments provide a liquid ebonite coating that has low tackiness that allows easy handling and inspection before vulcanization.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

In an exemplary embodiment of the present invention, a liquid ebonite mixture for coating surfaces contains a two-component reactive liquid elastomer. The formulation of the ebonite coating is prepared by mixing first and second components. The first component typically includes first unsaturated polymers, a vulcanization activator of zinc oxide, and a vulcanization agent. Sulfur is the main vulcanization agent. It is preferable that sulfur has fine particle size so that the dispersion will be easier. The first component further includes a thixotropic agent of fume silica or bentonite, a first viscosity reducer for adjusting the viscosity of the liquid ebonite mixture, and optionally a solubilizer for the vulcanization agent. The solubilizer preferably contains polyamine or polyamide amine. Alternatively, a chain extender of butandiol can be used to replace polyamine. Carbon black is used as a reinforcing agent, colorant and UV stabilizer. The amount of the reinforcing agent and the thixotropic agent should be minimized so that the viscosity of the ebonite coating does not increase drastically, so the liquid ebonite mixture can be sprayed easily. A urethane catalyst, such as dibutyl tin dilaurate (DBTDL), is also added into the first component. Alternatively, other urethane catalysts, such as K-KAT 348, a Bismuth carboxylate based compound, can also be used.

The selection of the first unsaturated polymers in the first component has to satisfy two requirements. First, the first unsaturated polymers must contain first functional groups that are capable of reaction at ambient temperature, either with or without a catalyst. The preferred functional groups are hydroxyl, epoxy, acrylic, and their combinations. Second, for vulcanization, the first unsaturated polymers must contain sufficient unsaturation in the backbones for forming sulfur linkages. It is preferable that the first unsaturated polymers contain backbones of polybutadiene. However, polyisoprene, poly(butadiene-co-acrylonitrile), poly(isobutyl-co-isoprene) or poly(ethylene-co-propylene-co-diene), which contain at least 10 mole % of dien unsaturation can also be used.

The second component typically includes second unsaturated polymers. The selected second unsaturated polymers must satisfy three requirements. First, the polymers must contain second functional groups, such as isocyanate or maleic anhydride, which will react with the first functional groups of the first unsaturated polymers at ambient condition. In addition, polyamine mixed in the first component is also reactive to the isocyanate groups in the second unsaturated polymers to form polyurea linkages, which accelerates the gelation process. Second, the polymers must contain sufficient unsaturated backbones to allow vulcanization with sulfur. Third, the polymers must be thermodynamically compatible with the first unsaturated polymers of the first component so that macroscopic phase separations will not occur and the sulfur vulcanization can happen homogeneously throughout the coating. It is preferable that the second unsaturated polymers contain backbones of polybutadiene. However, polyisoprene, poly(butadiene-co-acrylonitrile), poly(isobutyl-co-isoprene) or poly(ethylene-co-propylene-co-dien), which contain at least 10 mole % of diene unsaturation can also be used. The second component further contains a second viscosity reducer for adjusting the viscosity of the liquid ebonite mixture.

The first and second viscosity reducers in the first and second components typically contain unsaturated polymers similar to those used for the first and second unsaturated polymers (i.e., polybutadiene, polyisoprene, poly(butadiene-co-acrylonitrile), poly(isobutyl-co-isoprene), or poly (ethylene-co-propylene-co-dien.) The first and second viscosity reducers must have a lower viscosity than the first and the second unsaturated polymers. The first and second viscosity reducers may not contain functional groups. Otherwise, the first and second viscosity reducers may contain the same or similar functional groups as the first and second functional groups respectively so that the polymers and the viscosity reducer in each component remain non-reactive at ambient condition until the first and second components are mixed together. The first and second viscosity reducers also preferably contain sufficient unsaturation for sulfur vulcanization and must be thermodynamically compatible with the first and second unsaturated polymers in the first and second components. For example, the first viscosity reducer can be a lower molecular weight non-functional or hydroxyl functional liquid polybutadiene, polyisoprene, butadiene nitrile rubber. Liquid butyl or EPDM rubber, which contain at least 5 mole % of unsaturated monomer, can also be used.

Furthermore, either first or second component includes a vulcanization accelerator. Tetramethylthiuram disulfide, e.g., Methyl Tuads, is a preferred vulcanization accelerator because it gels and becomes tack free quickly, and can be vulcanized at lower temperature or in shorter time. However, polyamine works synergistically with Methyl Tuads to accelerate the sulfur vulcanization, which makes the sulfur curing feasible at 80° C. At ambient temperature, if Methyl Tuads is mixed in the first component with polyamine, gelation will occur in the first component. To maintain sufficient shelf life, Methyl Tuads must be separated from polyamine, and therefore it is mixed in the second component. Alternatively, other thiurams, such as, tetrabutylthiuram disulfide, tetraisobutylthiuram disulfide, tetrabenzylthiuram disulfide, 2-mercaptobenzothiazole, benzothiazyl disulfide, N-oxydiethylenebenzothiazole-2- sulfenamide, N-cyclohexyl-benzothizole-2-sulfenamide, N-tert-butyl-2-benzothiazolesulfenamide, can also be used. In addition, diphenylguanidine can be used as a vulcanization accelerator. It was observed that diphenylguanidine (DPG) can be mixed with polyamine in the first component without causing a shelf life problem. However, with DPG as the vulcanization accelerator, the gelation and tack free time are longer, and it requires at least two hours at 160° C. to complete the vulcanization.

The first and second components are formulated separately by mixing their composition. A liquid ebonite formulation for coating metals is prepared by simultaneously mixing and spaying the first and second components onto a metal substrate. The first and the second components are mixed with a ratio of between about 0.75 and about 2.75. Upon the mixing and spraying, the first functional groups in the first unsaturated polymers will react with the second functional groups of the second unsaturated polymers at ambient temperature, optionally with the aid of a catalyst, and the mixture gels to a non-gooey rubbery state. At this stage, an inspector can examine the coating to detect any holidays or imperfections. Any remedial actions such as additional coating can be applied to ensure coating reliability. By properly adjusting the degree of gelation to render the surface tack free, the coated parts can also be handled for assembly without getting hands messy.

After inspection and assembly, the coating is then heated to elevated temperature for sulfur vulcanization. The vulcanization condition can vary from 180° C. for 30 minutes to 80° C. for three days, depending on the selection of vulcanization accelerator and process temperature. During the heating, especially on a vertical surface, the coating does not sag or drip.

After the sulfur vulcanization, the coating is further hardened to a tough surface, which typically has hardness above 70 Shore D. The coating possesses excellent adhesion to steel and exhibits outstanding chemical resistance, typically of all ebonite compositions.

Tables 2a and 2b below show preferable compositions of first and second components in the liquid ebonite mixture according to an exemplary embodiment of the present invention. The mass parts of a compound is number of parts by mass of the compound in the mixture.

TABLE 2a

Compositions of First Component

| Description | Compound | Mass Parts |
|---|---|---|
| First unsaturated polymers | Hydroxyl terminated liquid polybutadiene | 50 |
| Thixotropic agent | Fume silica | 0–10 |
| Reinforcing agent | Carbon black | 0–10 |
| Vulcanization activator | Zinc oxide | 5–35 |
| Vulcanization agent | Sulfur | 15–50 |
| Solubilizer | Polyamine | 1.5–6 |
| Catalyst | DBTDL | 0–3 |
| First viscosity reducer | Non-functional liquid polybutadiene | 0–30 |

TABLE 2b

Compositions of Second Component

| Description | Compound | Mass Parts |
|---|---|---|
| Second unsaturated polymers | Isocyanate terminated liquid polybutadiene | 50 |
| Vulcanization accelerator | Tetramethylthiuram disulfide | 1–7 |
| Second viscosity reducer | Non-functional liquid polybutadiene | 0–30 |

Both first and second components can optionally contain additional fillers, flame retardants, color pigments, age resistors (e.g., antioxidants and antiozonants), processing oils and solvents.

Illustrations and Examples

To supplement the foregoing disclosure, the following examples are provided to illustrate specific aspects of the invention and particular techniques useful for making various coatings according to the present invention. However, it is to be understood that the examples are for illustrative purposes only and in no manner is the present invention limited to the specific disclosures therein.

EXAMPLE 1

The compositions of the first and second components in the ebonite mixture are shown in Tables 3a and 3b.

TABLE 3a

Compositions of First Component

| Compound | Description | Mass Parts |
|---|---|---|
| Polybd-R45HTLO | Hydroxyl terminated liquid polybutadiene first unsaturated | 50 |
| Cab-O-Sil M5 | Fume silica, thixotropic agent | 2.9 |
| Mogul L | Carbon black, reinforcing agent | 2.3 |
| Kadox 930 | Zinc oxide, vulcanization activator | 7 |
| Redball superfine | Sulfur, vulcanization agent | 50 |
| Unirez 2140 | Polyamine, sulfur solubilizer | 3 |
| Dabco T12 | DBTDL, catalyst | 1.7 |
| Ricon 130 | Non-functional liquid polybutadiene, viscosity reducer | 13 |
| | Subtotal | 129.9 |

TABLE 3b

Compositions of Second Component

| Compound | Description | Mass Parts |
|---|---|---|
| Krasol LBD3000 | TDI terminated liquid polybutadiene, second unsaturated polymer | 50 |
| Methyl Tuads | Tetramethylthiuram disulfide Vulcanization accelerator | 5 |
| Ricon 130 | Nonfunctional liquid polybutadiene, second viscosity reducer | 6.1 |
| | Subtotal | 61.1 |

The first component was mixed by charging Polybd-R45HTLO (available at Atofina), Cab-O-Sil (available at Cabot), Mogul L (available at Cabot), Kadox 930 (available at Zinc Corp. Of America), and Redball superfine (available at International Sulphur) into a metal can. The mixture was subjected to a high shear mixer, commonly known as Cowles or Lightening mixer operated at 300 to 3000 rpm for 30 minutes. Due to the shear action, the solid powders of Cab-O-Sil, Mogul L, Kadox 930, and Redball superfine were evenly dispersed into the Polybd-R45HTLO liquid rubber to form a homogeneous viscous liquid. The temperature of the mixture reached 65° C. At that time, Unirez (available at Arizona Chemicals) and was added, followed by Ricon 130 (available at Atofina) and Dabco T12 (available at Air Products).

The dispersion of the first component was checked by a Hegman gauge (ASTM D1210), and no solid particle greater than 0.003 inch was found in the first component, indicating a good dispersion. The viscosity of the first component was 60,900 cps at 30° C., which was measured by a Cole Palmer Viscometer (Model 98936, Spindle R7 at 25 rpm) according to ASTM D2196.

Second component was mixed, and its viscosity was measured using similar equipment and procedure as that used for the first component. (Krasol LBD3000 is available at Kaucuk, and Methyl Tuads is available at R. T. Vanderbilt). The viscosity of the second component was 63,900 cps at 30° C.

First and second component were then mixed in a mass ratio of 2.12 to 1 (i.e., 129.9/61.1). With this ratio, the mass % of sulfur was 26.2%. With their viscosity levels, the two components were readily mixed and sprayed on various substrates, which were a 4"×6"×0.032" steel panel (Q-Panel products), a 6"×6"×0.25" sand blasted steel plate, and a 8"×11.5"×0.004" polyester (Mylar) film, with a coating thickness of 0.020 inches. At 23° C, the coatings gelled in 4 minutes (i.e., the time needed for the mixtures to become elastic and stringy when picked with a spatula), and became tack free (i.e., there is no residue on a paper when it briefly touches the surface of the mixture) in 15 minutes. All coatings were then baked and vulcanized in an air-circulated oven at 180° C. for 30 minutes. The coating on the steel panel placed vertically in the oven during vulcanization did not drip or sag.

The vulcanized coating on the polyester substrate, after cooled down to room temperature, was then released as a stand-alone film. Sample then was cut or punched out for testing the tensile properties according to ASTM D638. The vulcanized coating had a tensile strength of 6436 psi, and an elongation of 8.2%. The coating hardness was determined to be 83 Shore D according to ASTM D2240. The chemical resistance of the vulcanized coating was also determined according to ASTM G20 by immersing the coating in toluene, 37.4% hydrochloric acid, 54% phosphoric acid, or 36% sulfuric acid. The changes in weight of the coatings after 21 days were 8.39%, 1.35%, 0.43%, and 0.30%, respectively, which indicated that the coating had an excellent resistance to acids and outstanding resistance to toluene swelling.

The vulcanized coating on the steel panel was used to determine the impact strength according to ASTM G14. The impact strength was 16 $lb_f$-in on the front of the panel (coating side) and was 12 $lb_f$-in on the back (steel side). The baked coating on the steel plate was used to determine the adhesion according to ASTM D4541. The pull-out adhesion force was 2200 psi that indicated excellent adhesion of the coating to the sand blasted steel surface.

EXAMPLE 2

The compositions of the first and second component in this example were the same as those in Example 1, which are shown in tables 3*a* and 3*b*, except the mixture ratio of the first component to the second component was 1.31, instead of 2.12, (i.e., the amount of the second component increased relatively to the amount of the first component in the mixture.) As a result, a mass % of sulfur decreased to 19.8%. The mixture was coated on the substrates that were the same of those used in Example 1. At 23° C., the coatings gelled in 3 minutes and became tack free in 12 minutes. All coatings were then baked and vulcanized in an air-circulated oven at 180° C. for 30 minutes. Problems of sagging and dripping were not observed for the coating on the steel panel placed vertically in the oven during vulcanization.

The test samples were prepared and the properties of the vulcanized coating were measured in the same way as described in Example 1. The vulcanized coating had a tensile strength of 7629 psi, and an elongation of 10.4%. The coating hardness was determined to be 80 Shore D. By immersing in toluene, 37.4% hydrochloric acid, 54% phosphoric acid, and 36% sulfuric acid for 21 days, the weights of the ebonite coatings changed 26.15%, 2.33%, 0.41%, and 0.38% respectively. These results indicated that the coating maintained excellent resistances to acids, but less resistance to toluene swelling than the coating formed in the Example 1. The impact strength was 32 $lb_f$-in on the front of the steel panel (coating side) and 16 $lb_f$-in on the back (steel side), and a pull-out adhesion force was 3000 psi.

The advantages of two-component reactive ebonite mixtures in Examples 1 and 2 are also -illustrated by considering the following comparative examples.

Comparative Example 1

In this example, a single component high viscosity mixture for coating was formulated according to the teachings of U.S. Pat. No. 5,766,687 with compositions shown in Table 2c.

TABLE 2c

| Compound Name | Compound, Description | Mass Parts |
|---|---|---|
| Polybd-600E | Epoxidized hydroxyl terminated liquid polybutadiene | 100 |
| Vulcan XC72R | Carbon black, reinforcing agent | 7 |
| Kadox 930 | Zinc oxide, vulcanization activator | 5 |
| Redball superfine | Sulfur, vulcanization agent | 35 |
| Unirez 2140 | Polyamine, sulfur solubilizer | 2 |

This single component liquid ebonite mixture had a high viscosity of 600,000 cps at 23° C., so it was not sprayable. The coating formed by this single component mixture was non-sag, but was gooey to the touch, therefore the handling and inspection of the coating were difficult. However, this mixture had developed satisfactory properties after vulcanization at 180° C. for 80 minutes. It had a tensile strength of 3079 psi and an elongation of 9.53%. The impact strength of the coating on a steel panel was greater than 56 $lb_f$-in on the front (coating side) and was 16 $lb_f$-in on the back. The coating had a pull-out adhesion strength of 3000 psi. By immersing the coating in toluene, 37.4% hydrochloric acid, 54% phosphoric acid, and 36% sulfuric acid for 21 days, the weights of the coatings changed 5.4%, 0.80%, 0.29%, and 0.36% respectively. (Polybd-600E is available from Atofina, and Vulcan XC72R is available from Cabot.)

Comparative Example 2

Compositions of another single component liquid ebonite mixture, which was also formulated according to the Rapporport's teachings, are shown in Table 3c.

TABLE 3c

| Compound Name | Compound, Description | Mass Parts |
|---|---|---|
| Polybd-R45HTLO | Hydroxyl terminated liquid polybutadiene | 100 |
| Vulcan XC72R | Carbon black, reinforcing agent | 5 |
| Kadox 930 | Zinc oxide, vulcanization activator | 5 |
| Redball superfine | Sulfur, vulcanization agent | 35 |
| Unirez 2140 | Polyamine, sulfur solubilizer | 3 |
| Vanax DPG | Diphenylguanidine | 3.5 |

This single component liquid ebonite mixture had a low viscosity of 31,700 cps at 23° C., so it was sprayable. However, the coating sagged and remained gooey to the touch before vulcanization, which caused difficulties in handling and inspection. However, the mixture had developed satisfactory properties after vulcanization at 180° C. for 80 minutes. The coating had a tensile strength of 4263 psi, an elongation of 22.8%, and a pull-out adhesion strength of 1500 psi. The impact strength of the coating on a steel panel was greater than 56 $lb_f$-in from the front of the panel (coating side) and was 56 $lb_f$-in from the back (steel side). By immersing in toluene, 37.4% hydrochloric acid, 54% phosphoric acid, and 36% sulfuric acid for 21 days, the weights of the coatings changed 2.46%, .2.46%, 0.33%, and 0.43% respectively. (Vanax DPG is available at R.T. Vanderbilt.)

EXAMPLE 3

The polyamine (i.e., sulfur solubilizer) in the first component of the Example 1 was substituted by a chain extender of 1,4-butandiol (available at ISP). The compositions of the first and second components are shown in Tables 4a and 4b.

TABLE 4a

Compositions of First Component

| Compound Name | Compound, Description | Mass Parts |
|---|---|---|
| Polybd-R45HTLO | Hydroxyl terminated liquid polybutadiene, first unsaturated polymer | 50 |
| Cab-O-Sil M5 | Fume silica, thixotropic agent | 1.2 |
| Mogul L | Carbon black, reinforcing agent | 2.3 |
| Kadox 930 | Zinc oxide, vulcanization activator | 7 |
| Redball superfine | Sulfur, vulcanization agent | 50 |
| 1,4-Butandiol | Butandiol, chain extender | 1.2 |
| Dabco T12 | Tin, catalyst | 1.7 |
| Ricon 130 | Non-functional liquid polybutadiene, viscosity reducer | 13 |
| | Subtotal | 126.4 |

TABLE 4b

Compositions of Second Component

| Compound Name | Compound, Description | Mass Parts |
|---|---|---|
| Krasol LBD3000 | TDI terminated liquid polybutadiene, second unsaturated polymer | 50 |
| Methyl Tuads | Tetramethylthiuram disulfide Vulcanization accelerator | 5 |
| Ricon 130 | Non-functional liquid polybutadiene, second viscosity reducer | 6.1 |
| | Subtotal | 61.1 |

The mixings of the first and second components were performed using the same equipment and a similar procedure as described in Example 1. The viscosity of the first component was determined of about 145,800 cps at 21° C., and the viscosity of the second component remained at 63,900 cps at 30° C.

The first and second components were mixed in a mass ratio of 2.07 to 1 and sprayed on various substrates similar with those used in the Example 1. At 23° C., the coatings gelled in 5 minutes and became tack free in 25 minutes. The coatings on the steel panel placed vertically in the oven did not drip or sag during the vulcanization.

The test samples were prepared and the properties of the vulcanized coating were measured in the same way as described in Example 1. The vulcanized coating had a tensile strength of 6055.1 psi, an elongation of 6.6%, and a hardness of 81 Shore D. The impact strength of the coating on a steel panel was 32 $lb_f$-in on the front (coating side) and was 12 $lb_f$-in on the back (steel side). The pull-out adhesion force was 2200 psi. By immersing in toluene, 37.4% hydrochloric acid, 54% phosphoric acid, and 36% sulfuric acid for 21 days, the weights of the vulcanized coatings changed 6.58%, 5.35%, 0.13%, and 0.14% respectively.

EXAMPLE 4

In this example, hydroxyl terminated liquid polybutadiene in the first component of the Example 1 was substituted by an epoxidized hydroxyl terminated liquid polybutadiene. The compositions of the first and second components are shown in Tables 5a and 5b.

TABLE 5a

Compositions of the First Component

| Compound Name | Compound, Description | Mass Parts |
|---|---|---|
| Polybd-600E | Epoxidized hydroxyl terminated liquid polybutadiene, first unsaturated polymer | 50 |
| Cab-O-Sil M5 | Fume silica, thixotropic agent | 1.2 |
| Mogul L | Carbon black, reinforcing agent | 2.3 |
| Kadox 930 | Zinc oxide, vulcanization activator | 7 |
| Redball superfine | Sulfur, vulcanization agent | 50 |
| Unirez 2140 | Polyamine, sulfur solubilizer | 3 |
| | Subtotal | 113. 5 |

TABLE 5b

| Compositions of Second Component | | |
|---|---|---|
| Compound Name | Compound, Description | Mass Parts |
| Krasol LBD3000 | TDI terminated liquid polybutadiene, second unsaturated polymer | 50 |
| Methyl Tuads | Tetramethylthiuram disulfide Vulcanization accelerator | 5 |
| Ricon 130 | Non-functional liquid polybutadiene, second viscosity reducer | 6.1 |
| | Subtotal | 61.1 |

The mixing of the first and second components were performed using the same equipment and a similar procedure as described in Example 1. The viscosity of the first component was 402,600 cps at 24° C., and the viscosity of the second components remained at 63,900 cps at 30° C.

The first and second components were readily mixed in a mass ratio of 2.07 to 1, and sprayed on the various substrates similar to those used in Example 1. At 23° C., the coatings gelled in 180 minutes and became tack free in 15 hours. Problems of dripping and sagging did not occur when the coating was formed on the steel panel placed vertically in an oven during the vulcanization.

The test samples were prepared and the properties of the coating were determined in the same way as described in Example 1. The vulcanized coating had a tensile strength of 6322.1 psi, an elongation of 7.5%, and a hardness of 81 Shore D. The impact strength was 16 $lb_f$-in on the front of the steel panel (coating side) and was 16 $lb_f$-in on the back (steel side). The pull-out adhesion force was 2200 psi. By immersing the coatings in toluene, 37.4% hydrochloric acid, 54% phosphoric acid, and 36% sulfuric acid for 21 days, the weights of the coatings changed 3.58%, 3.53%, 0.33%, and 0.14 respectively.

EXAMPLE 5

In this example, diphenylguanidine, Vanax DGP, was used as a vulcanization accelerator, instead of tetramethylthiuram disulfide (Methyl Tuads), and was mixed in the first component, instead of the second component. Vanax DGP was added in the first component with Unirex 2140 without shelf life problem. The compositions of the first and second components are shown in Tables 6a and 6b.

TABLE 6a

| Compositions of First Component | | |
|---|---|---|
| Compound Name | Compound, Description | Mass Parts |
| Polybd-R45HTLO | Hydroxyl terminated liquid polybutadiene, first unsaturated polymer | 50 |
| Kadox 930 | Zinc oxide, vulcanization activator | 5 |
| Redball superfine | Sulfur, vulcanization agent | 35 |
| Unirez 2140 | Polyamine, sulfur solubilizer | 3 |
| Vanax DGP | Diphenylguanidine, vulcanization accelerator | 3 |
| | Subtotal | 96 |

TABLE 6b

| Compositions of Second Component | | |
|---|---|---|
| Compound Name | Compound, Description | Mass Parts |
| Krasol LBD3000 | TDI terminated liquid polybutadiene, second unsaturated polymer | 50 |
| | Subtotal | 50 |

The two components were readily mixed and sprayed onto a substrate. At ambient condition, the coating gelled in 4 hours, and became tack free in 8 hours. The coating on a vertical steel panel did not drip or sag during vulcanization at 180° C. for 30 minute.

EXAMPLE 6

Vanax DGP was also used as a vulcanization accelerator in this example. In addition, DBTDL catalyst was added into the first component. Furthermore, 4,4' methylene diphenyldiisocyanate (MDI) terminated liquid polybutadiene, such as Krasol NN23 (available at Kaucuk), was used in the second component. The compositions of the first and second components were shown in Table 7a and 7b.

TABLE 7a

| Compositions of First Component | | |
|---|---|---|
| Compound Name | Compound, Description | Mass Parts |
| Polybd-R45HTLO | Hydroxyl terminated liquid polybutadiene, first unsaturated polymer | 50 |
| Cab-O-Sil M5 | Fume silica, thixotropic agent | 1.2 |
| Mogul L | Carbon black, reinforcing agent | 2.3 |
| Kadox 930 | Zinc oxide, vulcanization activator | 7 |
| Redball superfine | Sulfur, vulcanization agent | 50 |
| Vanax DGP | Diphenylguanidine, vulcanization accelerator | 5 |
| Dabco T12 | Tin, catalyst | 1.7 |
| Ricon 130 | Non-functional liquid polybutadiene, viscosity reducer | 13 |
| | Subtotal | 132.2 |

TABLE 7b

| Compositions of Second Component | | |
|---|---|---|
| Compound Name | Compound, Description | Mass Parts |
| Krasol NN23 | MDI terminated liquid polybutadiene, second unsaturated polymer | 50 |
| | Subtotal | 50 |

The mixing of the first component was performed using the same equipment and a similar procedure as described in Example 1. The viscosity of the first component was 75,500 cps at 27° C., and the viscosity of the second component was 900 cps at the same temperature.

The first and second components were mixed with a mass ratio of 2.57 to 1. These two components were readily mixed and sprayed onto various substrates similar to those used in Example 1. At 23° C., the coatings gelled in 1 minute and become tack free in 1.5 minutes. The coating on the vertical steel panel did not drip or sag during vulcanization in an oven.

The test samples were prepared and the properties of the vulcanized coatings were determined in the same way as described in Example 1. The vulcanized coating had a tensile strength of 5211.5 psi, an elongation of 6.0%, and a hardness of 79 Shore D. The impact strength of the vulcanized coating was 24lb$_f$-in on the front (coating side) and was 16 lb$_f$-in on the back (steel side). The pull-out adhesion force of the vulcanized coating was 22.00 psi. By immersing the vulcanized coating in toluene, 37.4% hydrochloric acid, 54% phosphoric acid, and 36% sulfuric acid for 21 days, the weights of the coatings only changed 0.47%, 1.60%, 0.22% and 0.10% respectively.

EXAMPLE 7

Compositions of the first and second components in this example were similar to those in the Example 5, except Krasol LBM 32, a maleic anhydride terminated liquid polybutadiene, was used in the second component, instead of Krasol LBD 3000, an isocyanate terminated liquid polybutadiene. Compositions of the first and second components are shown in Table 8a and 8b.

TABLE 8a

Compositions of First Component

| Compound Name | Compound, Description | Mass Parts |
|---|---|---|
| Polybd-R45HTLO | Hydroxyl terminated liquid polybutadiene, first unsaturated polymer | 50 |
| Kadox 930 | Zinc oxide, vulcanization activator | 5 |
| Redball superfine | Sulfur, vulcanization agent | 35 |
| Unirez 2140 | Polyamine, sulfur solubilizer | 3 |
| Vanax DPG | Diphenylguanidine, vulcanization accelerator | 3 |
| | Subtotal | 96 |

TABLE 7b

Compositions of Second Component

| Compound Name | Compound, Description | Mass Parts |
|---|---|---|
| Krasol LBM 32 | Maleic anhydride terminated liquid polybutadiene, second unsaturated polymer | 50 |
| | Subtotal | 50 |

The two components were readily mixed and sprayed onto a substrate. The coating gels at ambient condition in 2 hours and becomes tack free in 4. hours. The coating on a vertical substrate did not drip or sag during the vulcanization at 180° C. for 30 minutes.

It will be clear to one skilled in the art that the above embodiment may be altered in many ways without departing from the scope of the invention. Accordingly, the scope of the invention should be determined by the following claims and their legal equivalents.

What is claimed is:

1. A liquid ebonite mixture for coating comprising:

a) a first component comprising:

i) first unsaturated polymers having first functional groups capable of reaction at ambient temperature with or without a catalyst, wherein each of the first functional groups is selected from the group consisting of hydroxyl, epoxy, acrylic, and their combinations;

ii) a vulcanization activator;

iii) a sulfur vulcanization agent, wherein the mass parts of the sulfur vulcanization agent in the mixture is approximately 15–50; and b) a second component comprising:

i) second unsaturated polymers having second functional groups that react with the first functional groups of the first unsaturated polymers at ambient temperature, wherein each of the second functional groups is selected from the group consisting of isocyanate and maleic anhydride, wherein the first and second unsaturated polymers contain sufficient unsaturated backbones to allow vulcanization with the sulfur vulcanization agent, wherein the second unsaturated polymers are thermodynamically compatible with the first unsaturated polymers of the first component so that macroscopic phase separations will not occur and the sulfur vulcanization can happen homogeneously throughout the coating, and wherein the first and second unsaturated polymers are selected from the group consisting of polybutadiene, polyisoprene, poly(butadiene-co-acrylonitrile), poly (isobutyl-co-isoprene), and poly(ethylene-co-propylene-co-diene).

2. The mixture of claim 1, wherein the first component and the second component are mixed with a ratio between about 0.75 to 2.75.

3. The mixture of claim 1, wherein the first and the second unsaturated polymers contains at least 10 mole % of diene unsaturation.

4. The mixture of claim 1, wherein the mass parts of the first and second unsaturated polymers in the mixture are 50.

5. The mixture of claim 1, wherein first unsaturated polymer is partially epoxidized.

6. The mixture of claim 1, wherein the second unsaturated polymer is a toluene diisocyanate terminated prepolymer.

7. The mixture of claim 1, wherein the second unsaturated polymer is a 4,4'-methylene diphenyldiisocyanate terminated prepolymer.

8. The mixture of claim 1, wherein the first component further comprises a first viscosity reducer for adjusting a viscosity of the mixture.

9. The mixture of claim 8, wherein the first viscosity reducer comprises unsaturated polymers selected form the group consisting of polybutadiene, polyisoprene, poly (butadiene-co-acrylonitrile), poly(isobutyl-co-isoprene) and poly(ethylene-co-propylene-co-diene), and wherein the mass parts of the first viscosity reducer is approximately 0–30.

10. The mixture of claim 9, wherein the first viscosity reducer comprises a non-functional unsaturated polymers.

11. The mixture of claim 9, wherein the first viscosity reducer contains functional groups similar with the first functional groups of the first unsaturated polymers.

12. The mixture of claim 9, wherein the first viscosity reducer has a viscosity lower than a viscosity of the first unsaturated polymers.

13. The mixture of claim 1, wherein the second component further comprises a second viscosity reducer for adjusting the viscosity of the mixture.

14. The mixture of claim 13, wherein the second viscosity reducer comprises unsaturated polymers selected from the group consisting of polybutadiene, polyisoprene, poly (butadiene-co-acrylonitrile), poly(isobutyl-co-isoprene), and poly(ethylene-co-propylene-co-diene), and wherein the mass parts of the second viscosity reducer is approximately 0–30.

15. The mixture of claim 14, wherein the second viscosity reducer comprises non-functional unsaturated polymers.

16. The mixture of claim 14, wherein the second viscosity reducer contains functional groups similar with the second functional group of the second unsaturated polymers.

17. The mixture of claim 14, wherein the second viscosity reducer has a viscosity lower than a viscosity of the second unsaturated polymers.

18. The mixture of claim 1, wherein the first component further comprises a thixotropic agent.

19. The mixture of claim 18, wherein the thixotropic agent selected from the group consisting of fume silica and bentonite, and wherein the mass parts of the thixotropic agent is approximately 0–10.

20. The mixture of claim 1, wherein the first component further comprises a reinforcing agent.

21. The mixture of claim 20, wherein the reinforcing agent comprises carbon black, and wherein the mass parts of the reinforcing agent is approximately 0–10.

22. The mixture of claim 1, wherein the mass parts of the vulcanization agent is preferably 30–50.

23. The mixture of claim 22, wherein the first component further comprises a sulfur solubilizer.

24. The mixture of claim 22, wherein the sulfur solubilizer comprises polyamine, and wherein the mass parts of the sulfur solubilizer is approximately 1.5–6.

25. The mixture of claim 24, wherein the polyamine is a polyamide amine.

26. The mixture of claim 1, wherein the first component further comprises a chain extender.

27. The mixture of claim 26, wherein the chain extender comprises 1,4-butandiol, and wherein the mass parts of the chain extender is approximately 1.5–6.

28. The mixture of claim 1, wherein the first component further comprises a urethane catalyst, wherein the mass parts of the urethane catalyst is approximately 0–3.

29. The mixture of claim 1, wherein one of the first and second components further comprises a vulcanization accelerator, and wherein the mass parts of the vulcanization accelerator is approximately 1–7.

30. The mixture of claim 29, wherein the first component comprises the vulcanization accelerator.

31. The mixture of claim 30, wherein the vulcanization accelerator comprises diphenylguanidine.

32. The mixture of claim 29, wherein the second component comprises the vulcanization accelerator.

33. The mixture of claim 32, wherein the vulcanization accelerator is selected from the group consisting of tetramethylthiuram disulfide, tetrabutylthiuram disulfide, tetraisobutylthiuram disulfide, tetrabenzylthiuram disulfide, 2-mercaptobenzothiazole, benzothiazyl disulfide, N-oxydiethylenebenzothiazole-2-sulfenamide, N-cyclohexyl-benzothiazole-2-sulfenamide, N-tert-butyl-2-benzothiazolesulfenamide, and diphenylguanidine.

34. The mixture of claim 1, wherein the vulcanization activator selected from the group consisting of zinc oxide and zinc stearate, and wherein the mass parts of the vulcanization activator is approximately 5–35.

* * * * *